(12) United States Patent
Cantelar

(10) Patent No.: US 11,858,440 B1
(45) Date of Patent: Jan. 2, 2024

(54) DETACHABLE SEWER HOUSE STORAGE UNIT

(71) Applicant: Eduardo M Cantelar, Miami, FL (US)

(72) Inventor: Eduardo M Cantelar, Miami, FL (US)

(*) Notice: Subject to any disclaimer, the term of this patent is extended or adjusted under 35 U.S.C. 154(b) by 0 days.

(21) Appl. No.: 18/346,855

(22) Filed: Jul. 5, 2023

(51) Int. Cl.
*B60R 19/48* (2006.01)
*B60R 9/06* (2006.01)
*E03F 1/00* (2006.01)
*B60R 15/00* (2006.01)
*B60R 19/50* (2006.01)

(52) U.S. Cl.
CPC .............. *B60R 19/50* (2013.01); *B60R 19/48* (2013.01); *B60R 9/065* (2013.01); *B60R 15/00* (2013.01); *E03F 1/008* (2013.01)

(58) Field of Classification Search
CPC ......... B60R 9/065; B60R 19/48; B60R 19/50; B60R 15/00; B60R 15/04; E03F 1/008
USPC .......................................... 293/106, 116, 117
See application file for complete search history.

(56) References Cited

U.S. PATENT DOCUMENTS

| | | | | |
|---|---|---|---|---|
| 3,471,070 A * | 10/1969 | Olson | ...................... | B60R 9/065 |
| | | | | 280/505 |
| 3,614,136 A * | 10/1971 | Dent | ...................... | B60R 19/48 |
| | | | | 220/255 |
| 4,570,986 A * | 2/1986 | Sams | ...................... | B60R 11/06 |
| | | | | 224/489 |
| 4,674,782 A * | 6/1987 | Helber | ...................... | B60R 9/065 |
| | | | | 224/489 |
| 4,938,399 A * | 7/1990 | Hull | ...................... | B60R 9/06 |
| | | | | 280/415.1 |
| 4,979,843 A * | 12/1990 | Perry | ...................... | F16B 2/205 |
| | | | | 293/106 |
| 5,364,142 A * | 11/1994 | Coiner | ...................... | B60R 19/48 |
| | | | | 293/106 |
| 5,823,585 A * | 10/1998 | Tanguay | ...................... | B60R 19/48 |
| | | | | 293/106 |
| 6,598,914 B1 * | 7/2003 | Dixon | ...................... | B60R 15/02 |
| | | | | 296/180.1 |
| 7,121,597 B2 * | 10/2006 | Chuang | ...................... | B60R 9/06 |
| | | | | 224/489 |
| 8,672,371 B1 * | 3/2014 | Russell | ...................... | B60R 19/48 |
| | | | | 293/106 |
| 9,649,996 B1 * | 5/2017 | Mohlencamp | ...................... | B60R 15/00 |
| 9,701,266 B2 * | 7/2017 | Pena Casimiro | ...................... | B60R 13/07 |
| 10,821,927 B1 * | 11/2020 | Martin | ...................... | B60R 15/00 |
| 11,584,319 B2 * | 2/2023 | Luo | ...................... | B60R 19/48 |
| 2003/0218342 A1 * | 11/2003 | Jones | ...................... | B60R 19/48 |
| | | | | 293/117 |
| 2010/0051627 A1 * | 3/2010 | Kucks | ...................... | B60R 9/065 |
| | | | | 220/592.03 |
| 2015/0175085 A1 * | 6/2015 | Raley | ...................... | B60R 3/00 |
| | | | | 224/519 |

(Continued)

*Primary Examiner* — Gregory A Blankenship
(74) *Attorney, Agent, or Firm* — Ruben Alcoba, ESQ

(57) ABSTRACT

A bumper hitch that houses a sewer hose, the bumper hitch attaches to a recreational vehicle. The bumper hitch comprises of a rectangular housing that has an open upper section. A central hitch that extends perpendicularly outward from a central rear section of the rectangular housing. The rectangular housing has a drain. A rectangular door is pivotally attached to the open upper section of the rectangular housing. And, a drain plug is removably attached to the drain. The bumper hitch can further comprise of a solar panel light system.

4 Claims, 3 Drawing Sheets

(56) References Cited

U.S. PATENT DOCUMENTS

2019/0126839 A1* 5/2019 Grizzle .................... B60R 9/06
2022/0250568 A1* 8/2022 Luo ........................ B60R 19/48

* cited by examiner

DETACHABLE SEWER HOUSE STORAGE UNIT

TECHNICAL FIELD

The present invention pertains to a detachable sewer house storage unit that houses a sewer hose that is made for recreational vehicles that store sewage.

BACKGROUND

The inventor of the present invention is an avid outdoorsman that owns a recreational vehicle.

During his travels, the most disgusting item he handles is the sewer hose that he stores in his recreational vehicle.

Not only is the handling a disgusting task, but the stowage of the sewer hose is another complication.

Often, the sewer hose is stored alongside items that should never be near the sewer hose.

Presently, some campers have taken to place the sewer hoses within the rear bumpers of campers. This is normally done by taking the end of a rear recreational vehicle camper and pushing the sewer hose into the bumper. As can be understood, this leads to the uncomfortable task of having to handle the sewer hose extensively and in turn dirtying oneself with sewage. Another complication with this practice is that, more often than not, sewage spills into the body of the bumper and thereby causes a bumper to rust from within while simultaneously also growing unwanted and harmful bacteria.

The inventor of the present invention has conceived an emergency storage sewer bumper hitch that not only will store the sewer hose, the invention will also provide a solar powered emergency warning device that will alert others of when the vehicle is disabled.

The present invention solves the needs of storing a sewer hose in a semi-hygienic manner in a recreational vehicle, while also providing the recreational vehicle with a solar powered safety feature.

SUMMARY

The present invention is directed to a bumper storage compartment hitch that houses a sewer hose, the detachable sewer house storage unit is attached to a recreational vehicle. The detachable sewer house storage unit comprises a rectangular housing that has an open upper section, the rectangular housing has a central hitch that extends perpendicularly outward from a central rear section of the rectangular housing, the rectangular housing defines a drain on a bottom section of the rectangular housing. A rectangular door that is pivotally attached to the open upper section of the rectangular housing. And, a drain plug that is removably attached to the drain.

In a preferred embodiment of the present invention, the detachable sewer house storage unit further comprises of a solar panel that is attached to an upper side of the rectangular door. A controller that is housed within the rectangular housing, the controller is operatively connected to the solar panel. A battery that is housed within the rectangular housing, the battery is operatively connected to the controller. And, a light that is attached to a lower side of the rectangular door, the light is operatively connected to the controller.

An object of the present invention is to provide a sewer hose storage device that is attached to a recreational vehicle.

Another object of the present invention is to provide a detachable sewer house storage unit that can serve as an emergency warning device that is solar powered.

BRIEF DESCRIPTION OF THE DRAWINGS

These and other features, aspects, and advantages of the present invention will become better understood with regards to the following description, appended claims, and drawings where:

DESCRIPTION

Figure 1:
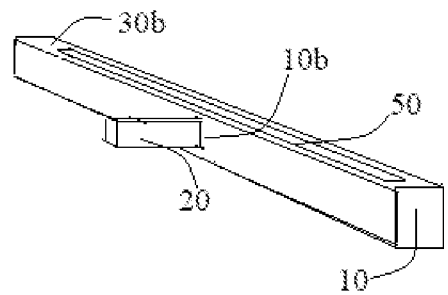
FIG. 1 is a rear perspective view of the present invention.
Figure 2:
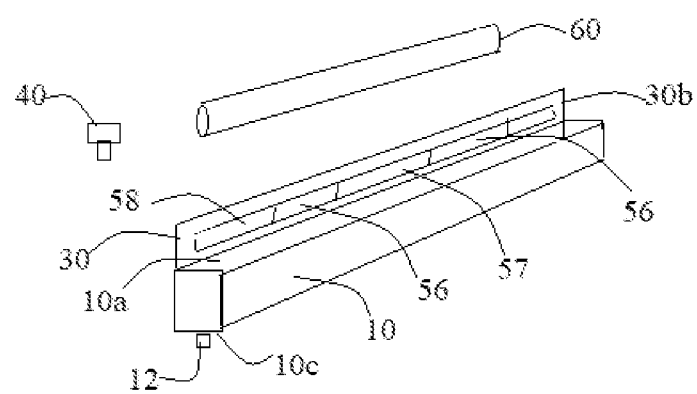
FIG. 2 is a front perspective view of the present invention, the view shows how a sewer hose would be stored in the present invention.
Figure 3:
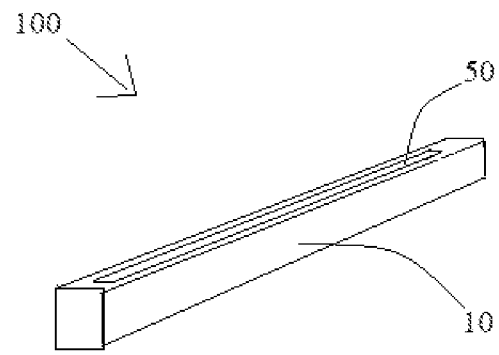
FIG. 3 is a front perspective view of the present invention that shows the solar panel of the present invention.
Figure 4:
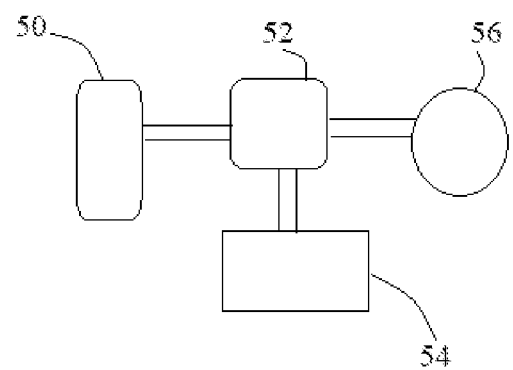
FIG. 4 is a diagram of how the solar light system of the present invention is wired.
Figure 5:
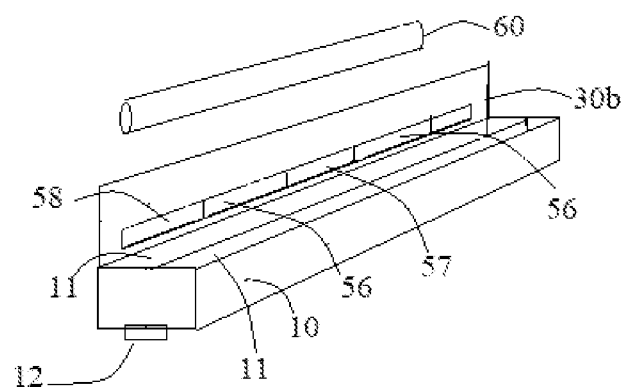
FIG. 5 is a perspective view of the present invention that shows the present invention having a dual storage compartment.

As seen in FIGS. 1-5, the present invention is a detachable sewer house storage unit 100 that houses a sewer hose 60 that is attached to a recreational vehicle that attaches to a hitch receiver of an existing bumper of a recreational vehicle or to a hitch receiver of the recreational vehicle.

The bumper hitch 100 comprises a rectangular housing 10 that has an open upper section 10a, the rectangular housing has a central hitch 20 extending perpendicularly outward from a central rear section 10b of the rectangular housing 10, the rectangular housing 10 defines a drain 12 on a bottom section 10c of the rectangular housing 10. A rectangular door 30 that pivotally attached to the open upper section 10a of the rectangular housing 10. And, a drain plug 40 that is removably attached to the drain 12.

In an embodiment of the present invention. the detachable sewer house storage unit 100 comprises a solar panel 50 that is attached to an upper side 30a of the rectangular door 30. A controller 52 that is housed within the rectangular housing 10, the controller 52 is operatively connected to the solar panel 50. A battery 54 that is housed within the rectangular housing 10, the battery 54 is operatively connected to the controller 52. And, a light 56 that is attached to a lower side 30b of the rectangular door 30, the light 56 is operatively connected to the controller 52.

In another embodiment of the present invention, the detachable sewer house storage unit 100 comprises an emergency reflector 57 that attaches to a lower side 30b of the rectangular door 30.

In yet another embodiment of the present invention, the detachable sewer house storage unit 100 comprises a mirror 58 that attaches to a lower side 30b of the rectangular door 30.

In still another embodiment of the present invention, the rectangular housing 10 is divided into a pair of individual compartments 11 that run along a length of the rectangular housing 10.

An advantage of the present invention is that it provides a sewer hose storage device that attaches to a recreational vehicle.

Another advantage of the present invention is that it provides a bumper storage compartment hitch that serves as an emergency warning device that is solar powered.

The embodiments of the detachable sewer house storage unit described herein are exemplary and numerous modifications, combinations, variations, and rearrangements can be readily envisioned to achieve an equivalent result, all of which are intended to be embraced within the scope of the appended claims. Further, nothing in the above-provided discussions of the detachable sewer house storage unit should be construed as limiting the invention to an embodiment or a combination of embodiments. The scope of the invention is defined by the description, drawings, and claims.

What is claimed is:

1. A detachable sewer house storage unit that houses a sewer hose that is made for recreational vehicles that attaches to a hitch receiver of an existing bumper of the recreational vehicle or to the hitch receiver of the recreational vehicle, the detachable sewer house storage unit comprises:
    a rectangular housing that has an open upper section, the rectangular housing has a central hitch that extends perpendicularly outward from a central rear section of the rectangular housing, the rectangular housing defines a drain on a bottom section of the rectangular housing;
    a rectangular door that is pivotally attached to the open upper section of the rectangular housing; and
    a drain plug that is removably attached to the drain;
    a solar panel that is attached to an upper side of the rectangular door;
    a controller that is housed within the rectangular housing, the controller is operatively connected to the solar panel;
    a battery that is housed within the rectangular housing, the battery is operatively connected to the controller; and
    a light that is attached to a lower side of the rectangular door, the light is operatively connected to the controller.

2. The detachable sewer house storage unit that houses the sewer hose that is made for recreational vehicles that attaches to the hitch receiver of the existing bumper of the recreational vehicle or to the hitch receiver of the recreational vehicle of claim 1, the detachable sewer house storage unit comprises an emergency reflector that attaches to a lower side of the rectangular door.

3. The detachable sewer house storage unit that houses the sewer hose that is made for recreational vehicles that attaches to the hitch receiver of the existing bumper of the recreational vehicle or to the hitch receiver of the recreational vehicle of claim 2, the detachable sewer house storage unit comprises a minor that attaches to a lower side of the rectangular door.

4. The detachable sewer house storage unit that houses the sewer hose that is made for recreational vehicles that attaches to the hitch receiver of the existing bumper of the recreational vehicle or to the hitch receiver of the recreational vehicle of claim 1, wherein the rectangular housing is divided into a pair of individual compartments that run along a length of the rectangular housing.

* * * * *